United States Patent
Orrino et al.

(10) Patent No.: US 11,235,248 B1
(45) Date of Patent: Feb. 1, 2022

(54) ONLINE BEHAVIOR USING PREDICTIVE ANALYTICS

(71) Applicant: International Business Machines Corporation, Armonk, NY (US)

(72) Inventors: Dilan Orrino, Chapel Hill, NC (US); Alexander McMullen, West New York, NJ (US); Frank Somich, New York, NY (US); Stephan Joseph Roorda, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/940,776

(22) Filed: Jul. 28, 2020

(51) Int. Cl.
  *A63F 13/75* (2014.01)
  *A63F 13/79* (2014.01)
  *G06Q 50/00* (2012.01)
  *A63F 13/87* (2014.01)
  *G06N 20/00* (2019.01)
  *A63F 13/69* (2014.01)

(52) U.S. Cl.
  CPC .............. *A63F 13/75* (2014.09); *A63F 13/69* (2014.09); *A63F 13/79* (2014.09); *A63F 13/87* (2014.09); *G06N 20/00* (2019.01); *G06Q 50/01* (2013.01)

(58) Field of Classification Search
  None
  See application file for complete search history.

(56) References Cited

U.S. PATENT DOCUMENTS

| | | | |
|---|---|---|---|
| 7,604,541 B2 | 10/2009 | Aikin et al. | |
| 7,925,044 B2 | 4/2011 | Metois et al. | |
| 8,301,653 B2 | 10/2012 | Adamousky et al. | |
| 8,564,591 B2 | 10/2013 | Bhogal et al. | |
| 8,955,129 B2 | 2/2015 | Cao et al. | |
| 9,208,502 B2 | 12/2015 | Parikh et al. | |
| 9,690,775 B2 | 6/2017 | Fink et al. | |
| 10,389,749 B2 | 8/2019 | Kozloski et al. | |
| 2011/0184982 A1* | 7/2011 | Adamousky | G06F 21/552 707/776 |

(Continued)

OTHER PUBLICATIONS

Constine, J. "Instagram now uses machine learning to detect bullying within photos—TechCrunch," https://techcrunch.com/2018/10/09/instagram-bullying-photos/, printed Jan. 9, 2020, 2 pgs.

(Continued)

*Primary Examiner* — Jason T Yen
(74) *Attorney, Agent, or Firm* — Peter K. Suchecki (57) ABSTRACT

Provided is a method, computer program product, and system for improving online behavior in social networking environments using predictive analytics. A processor may monitor communications and user action data of a plurality of users participating in a social networking environment. The processor may analyze the communications and the user action data to determine a user score related to a set of behavioral characteristics for each of the plurality of users. The processor may compare the user score for each of the plurality of users to a set of corrective action thresholds. In response to a first user score associated with a first user meeting one of the set of corrective action thresholds, the processor may implement a first corrective action related to improving behavior of the first user.

17 Claims, 6 Drawing Sheets

(56) References Cited

U.S. PATENT DOCUMENTS

| | | | |
|---|---|---|---|
| 2011/0312398 A1* | 12/2011 | Ziegler | A63F 13/533 463/9 |
| 2016/0261533 A1 | 9/2016 | Cecchi et al. | |
| 2018/0341877 A1 | 11/2018 | Panattoni et al. | |
| 2019/0266242 A1* | 8/2019 | Arumugam | H04L 51/12 |
| 2021/0058352 A1* | 2/2021 | Fogu | H04L 51/32 |

OTHER PUBLICATIONS

Dadvar et al., "Experts and Machines Against Bullies: A Hybrid Approach to Detect Cyberbullies." In: Sokolova M., van Beek P. (eds) Advances in Artificial Intelligence. Canadian AI 2014. Lecture Notes in Computer Science, vol. 8436 Springer, pp. 275-281, 2014.

Dinakar et al., "Modeling the Detection of Textual Cyberbullying." 2011, 5th International AAAI Conference on Weblogs and Social Media, https://www.aaai.org/ocs/index.php/ICWSM/ICWSM11/paper/view/3841/4384, 7 pgs.

Kim et al., "Efficiently detecting outlying behavior in video-game players," https://peerj.com/articles/1502/, Dec. 10, 2015, 11 pgs.

Mell et al., "The NIST Definition of Cloud Computing," Recommendations of the National Institute of Standards and Technology, U.S. Department of Commerce, Special Publication 800-145, Sep. 2011, 7 pgs.

Murnion et al., "Machine Learning and Semantic Analysis of In-game Chat for Cyber Bullying," Computers & Security, vol. 76, Jul. 2018, pp. 197-21.

NBC News, "Instagram to use ai Uncial intelligence to detect bullying in photos," https://www.nbcnews.com/tech/tech-news/instagram-use-artificial-intelligence-detect-bullying-photos-n918291, printed Jul. 27, 2020, 1 pg.

Potoroaca, A. "Instagram is rolling out a feature that will warn bullies and shadow ban them," The new AI will stop bullies in their tracks. Jul. 9, 2019 [Accessed Oct. 6, 2019] https://www.techspot.com/news/80854-instagram-rolling-out-feature-warn-bullies-shadow-ban.html, 3 pgs.

* cited by examiner

ONLINE BEHAVIOR USING PREDICTIVE ANALYTICS

BACKGROUND

The present disclosure relates generally to the field of predictive analytics, and more specifically to improving online behavior in social networking environments using predictive analytics.

Social networking environments (e.g., chat rooms, social media platforms, online gaming, and the like) can be a ripe place for bullying and/or negative behavior. From online gaming to chat rooms, a social networking environment can be a hostile arena in which to participate. In many instances, these environments are meant to provide fun and enjoyment for the participants involved. However, there are times when one or more participants may become frustrated, negative, and/or hostile when expressing themselves through their actions or comments within the environment. When this negative behavior is expressed, it typically ruins the online experience of others participating in the social networking environment.

SUMMARY

Embodiments of the present disclosure include a method, computer program product, and system for improving online behavior in social networking environments using predictive analytics. A processor may monitor communications and user action data of a plurality of users participating in a social networking environment. The processor may analyze the communications and the user action data to determine a user score related to a set of behavioral characteristics for each of the plurality of users. The processor may compare the user score for each of the plurality of users to a set of corrective action thresholds. In response to a first user score associated with a first user meeting one of the set of corrective action thresholds, the processor may implement a first corrective action related to improving behavior of the first user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of predictive analytics, and more particularly to improving online behavior in social networking environments using predictive analytics. While the present disclosure is not necessarily limited to such applications, various aspects of the disclosure may be appreciated through a discussion of various examples using this context.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Social networking environments (e.g., chat rooms, social media, online gaming, and the like) can be a ripe place for bullying and/or negative behavior. Specifically, online gaming environments result in many occurrences of negative behavior towards other players. For example, in multiplayer online gaming environments the players are typically required to work together to accomplish a set of goals. In many instances, the players of a group may have varying skill levels. Because of this, there are times when a less skilled player makes a poor move and the other skilled players on the team might engage in negative messages toward the less skilled player. Many times, if the less skilled player continues to make poor moves, a hostile player within the group may become increasingly negative towards all the other players. This can cause an in-game phenomenon called "tilt." Tilt is when a player's mistakes compound on each other causing increasingly worse mistakes due to frustration. When this happens, very obscene chat messages can occur (e.g., online bullying) ruining the online experience for the other players in the multiplayer game.

To prevent online bullying in multiplayer gaming environments, hostile players may be penalized by varying techniques. The simplest way to penalize a hostile player is for the other players (e.g., the less skilled player or the other players in the game) to mute the hostile player. However, this technique fails to successfully stop the bullying caused by the hostile player because that player is still a part of the group within the multiplayer game. In many instances, when muted the hostile player may begin to intentionally perform poorly (e.g., allowing their character to be defeated easily, allowing other competitors to take various objectives from their group, purposely performing incorrect moves or no moves at all, etc.) as a result of their frustration.

Another technique for penalizing a hostile player is the use of a reporting system. After the game, players can report other players for negative behavior. Typically, these reports must first go through a manual sorting process to decide if the report is legitimate. Then if the claim is legitimate, problem players can be suspended or banned. However, this technique is also flawed because the reporting system may be abused by players submitting false reports. Further, the penalty resulting from a legitimate report is ineffective. In many instances, a banned and/or suspended player may easily access the online game using a new name and/or different account allowing the player to continue to engage in negative behavior.

Other social networking environments, such as social media platforms, are also susceptible to online bullying. In many instances, online bullying will take the form of negative comments posted on a user's personal space (e.g., blog, profile page, etc.) by a hostile user. Like bullying in online gaming, the techniques for penalizing a hostile user on social media platforms are ineffective.

Embodiments of the present disclosure relate to a system for improving online behavior in social networking environments using predictive analytics. The system utilizes a combination of machine learning and natural language understanding (NLU) to detect when a hostile user (e.g., online game player, social media account user, private network user, etc.) is engaging in negative behavior by analyzing communications and user actions within a social networking environment. Once a hostile user is detected, the system implements varying levels of corrective actions to mitigate and/or improve the behavior of the hostile user.

In this way, the system attempts to improve the behavior of the hostile user by gradually increasing the severity of respective corrective actions rather than initially suspending and/or banning the hostile user from the social networking environment. The system may utilize a progressive feedback system to determine which corrective actions have been effective in improving the behavior of the hostile user and implement those corrective actions accordingly. In many instances, the system will address negative and/or hostile behavior before it becomes uncontrollable, resulting in an improved experience for all users participating in the social networking environment.

In embodiments, the system may monitor communications (e.g., unstructured data, spoken content, text messages, etc.) and user action data (e.g., player actions, game play objectives, player skill level, mouse clicks, keyboard strokes, metadata, etc.) of a plurality of users participating in a social networking environment. Participating in the social networking environment may include actions such as communicating between the users (e.g., chat box, email, etc.), participating in game play, posting comments to message boards, and the like. The social networking environment may be any type of online environment where users interact with each other (e.g., online game, social media website/platform, private network, etc.).

For example, in an online gaming environment, the system may monitor a chat box and/or spoken communications between users to detect the presence of negative, hostile, and/or bullying language (e.g., use of offensive language, negative words toward other users, etc.). Further, the system may monitor users' in-game actions to determine behavioral characteristics based on how each user is performing in the game. For example, the system may monitor how often the user loses, completes objectives, or makes logical/illogical moves during in-game action.

Using NLU and machine learning, the system continuously analyzes the communications and the user action data to determine an ongoing user score for each user related to their behavioral characteristics. For example, the system may use metrics such as user ratings/opinions provided by other users, in-game user interactions with other users and/or opponents, game objective progress, and/or user skill level to determine the user score for each of the plurality of users. For example, an experienced user may be assessed a relatively high user score (e.g., 85 out of 100, 1/10, etc.) based on high user ratings given by other users, achievement of many in-game objectives, engagement in cordial/positive conversations with other users, and a relatively high skill level in comparison to other users.

In embodiments, the user score may be determined by using any type of machine learning and/or scoring model. For example, the user score may be determined using a single overall score or a combination of separate scores assigned to each respective behavioral characteristic related to the user. In some embodiments, the system may include weighted scores for various behavioral characteristics depending on the importance of the behavioral characteristic in relation to accurately predicting a user's online behavior.

For example, scoring of in-game communications between users may be weighted higher because historical data has shown that the presence of negative comments is more indicative of hostile/negative behavior than through detecting negative behavior using user action data. It is contemplated that the user score can be determined in a variety of ways and the examples included here are not meant to be limiting.

In embodiments, the system may analyze various trends related to the behavioral characteristics of the users enabling the system to provide appropriate user scores for users of varying skill level. For example, the user score related to a new user may initially be low and/or trend in a significantly negative direction because the new user has not yet mastered the intricacies of the game (e.g., receiving low user ratings from other users, failing to achieve in-game objectives, low skill rating, etc.), while the user score of an expert level user may be expected to change/trend only slightly. In this way, the system may utilize trend analysis to provide appropriate scoring (e.g., new users vs. experienced user) to prevent the system from incorrectly identifying a new or novice user as a hostile user because of the presence of a low user score and/or a significant drop in the user score when learning the game.

In embodiments, the system may further utilize a predetermined time period (e.g., 1 week, 1 month, 3 months, etc.) for determining the user score. For example, the system may analyze the set of behavioral characteristics related to the user score over a one-week period to properly assess each user. In some embodiments, specifically for an online gaming environment, the system may utilize a predetermined amount of games played by the user to determine the user score. In this way, the system will avoid determining user scores based on a limited set of data points. In some embodiments, the system may utilize a default user score for new users and adjust the score appropriately as more data is acquired. In some embodiments, the default user score may be initially determined by analyzing crowd sourced data from other new users participating in similar or the same social networking environment.

In embodiments, the user score may be continuously adjusted based on the analysis of the current communications and user action data with respect to the set of behavior characteristics of each user. For example, the system may detect communications and user action data that indicate an experienced user is becoming hostile to one or more other users. For example, the system may detect negative words in a chat box and determine through user actions that the experienced user has failed to achieve various objectives that a user of their skill level typically achieves (e.g., intentionally losing the game, illogical in-game moves, etc.).

Once detected, the system may adjust the user score in relation to the presence of the negative behavior. For example, the system may reduce the user score of the experienced user (e.g., user score reduced from 85 to 75) based on the severity of the negative behavior. Alternatively, user scores may be adjusted by the system when positive communications and user action data is detected. For example, a user score will be increased when a user communicates positive messages to other users and/or achieves various objectives within the game. In this way, the user score may be continuously adjusted based on how each user is currently performing and interacting with the other users.

Once the user score is determined for each user, the system will compare the user scores to a set of corrective action thresholds. In embodiments, the corrective action thresholds may be any type of threshold used to analyze the user score. In embodiments, the corrective action threshold may comprise a range, a minimum or maximum value, a trend value, or a specific user score value. In embodiments, the set of corrective action thresholds may correspond to a set of corrective actions, respectively. For example, a first corrective action threshold may correspond to implementing a first corrective action, while a second corrective action threshold may correspond to implementing a second corrective action, and so on. Once a user score meets one of the corrective action thresholds, the system will implement a corresponding corrective action related to improving behavior of the respective user. In some embodiments, the corrective action thresholds may be user-specific or score-specific. For example, a user with an initial user score value of 85 may have a first corrective action threshold of 75, whereas a user with an initial user score value of 50 may have a first corrective action threshold of 45.

Returning to the previous example from above, the system will compare the experienced user's user score (e.g., reduced user score of 75) to the set of corrective action thresholds (e.g., for the user, based on the user's initial score, etc.). If the user score meets or exceeds one of the corrective action thresholds, the system will determine the experienced user is becoming a hostile user and implement a corresponding corrective action. For example, a first corrective action threshold may include a user score range of 70-75. Because the experienced user's reduced user score now falls within this range, the system will implement a first corrective action that corresponds to the first corrective action threshold.

The set of corrective actions may include any type of action that may improve the behavior of the user (e.g., hostile user). For example, the corrective action may be in the form of an in-game message sent to the user with tips on improving behavior (e.g., tips on sportsmanship, providing encouragement to others, etc.). In another example, the corrective action may suspend or ban a hostile user from participating in a group objective (e.g., character confined in another area in a multiplayer game while other users complete a mission).

In embodiments, each subsequent corrective action may increase in severity as further corrective action thresholds are met (e.g., a hostile user's user score continues to drop for continued negative behavior meeting more thresholds). For example, a first corrective action may be a warning, while a second corrective may result in a reduction of the user's skill level and/or forfeiture of various objects/tokens acquired over the span of the hostile user's game play. Alternatively, the system may include corrective action thresholds that correspond to positive corrective actions that encourage or reward positive improvement in the hostile user's behavior.

For example, as a user's user score increases because of positive communications and positive game play the system may implement corrective actions that reward the user for increasing their user score. For example, the system may reward a user with an in-game token, a game credit, or enter the user into a drawing for a prize in response to an increased user score. In this way, the system utilizes a reformative approach to correcting negative behavior by implementing corrective actions that reward positive improvements in online behavior while penalizing users for continued negative behavior.

In embodiments, the system may utilize a feedback model to determine the effectiveness of each corrective action with respect to the user. The feedback model will continuously analyze subsequent communications and user action in response to the system implementing corrective actions to determine if there is any change in the user's behavior.

For example, if the user score of an expert user begins to trend negatively it is likely an indication that the user is showing signs of negative behavior. However, if the trending levels out and/or begins trending in the positive direction in response to implementing a corrective action, the feedback model will use this data as an indication that this corrective action has improved the expert user's behavior. The system may utilize various trending data to adjust the corrective action thresholds for each user, such that when the users achieve prolonged periods of positive trends or certain user scores, then the frequency of implementing corrective actions may be limited or cease.

In embodiments, the system may utilize machine learning to analyze historic responses to historic corrective actions to determine which corrective actions produce the highest success rates in improving behavior of users. Once determined, the corrective actions with the highest success rates may be implemented initially or more frequently by the system in an attempt to quickly improve or mitigate negative behavior of hostile users. In this way, the system may become more accurate in implementing corrective actions that have been shown to improve poor behavior in the past.

The aforementioned advantages are example advantages, and not all advantages are discussed. Furthermore, embodiments of the present disclosure can exist that contain all, some, or none of the aforementioned advantages while remaining within the spirit and scope of the present disclosure.

Figure 1:
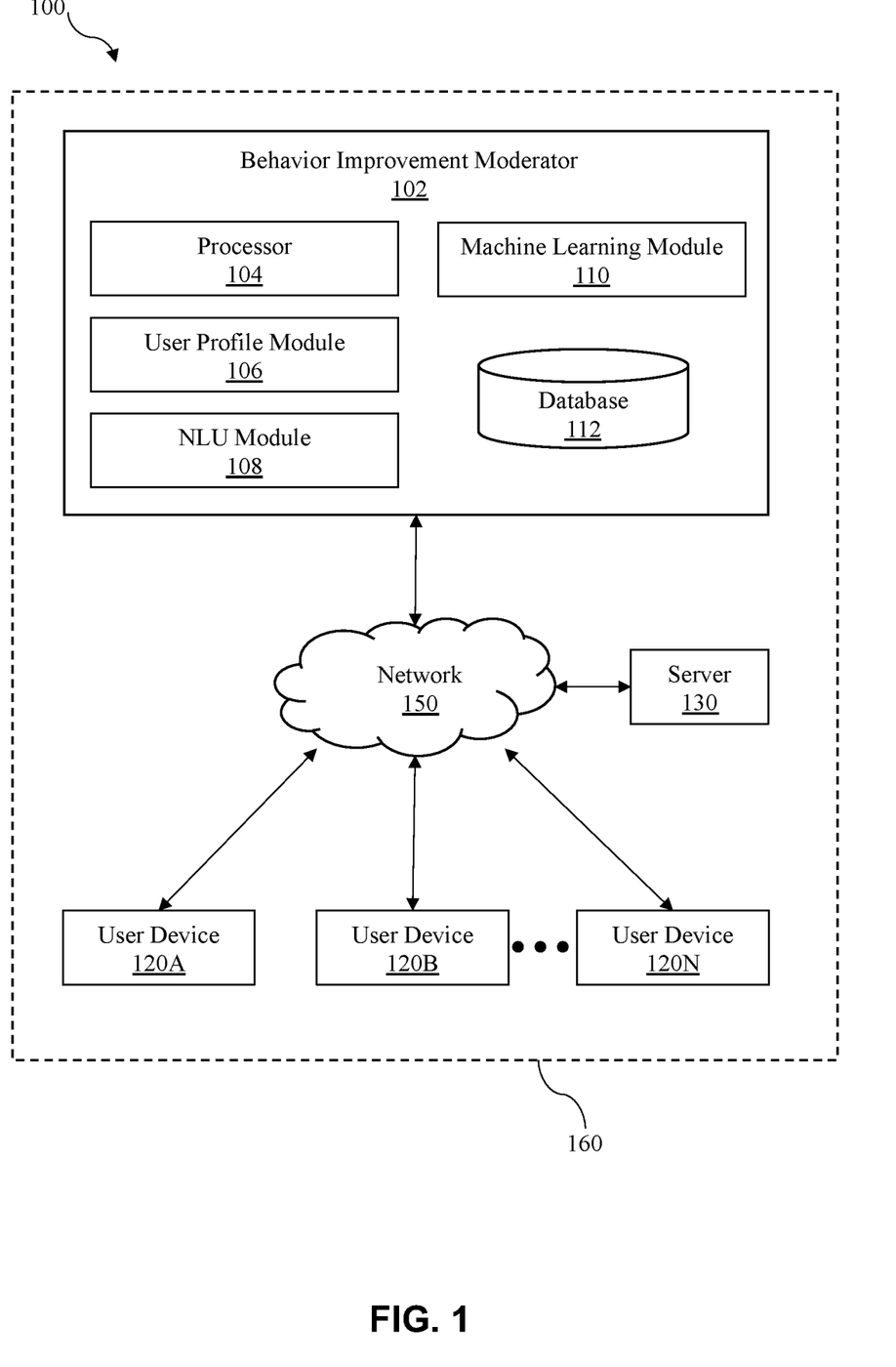
FIG. 1 illustrates a block diagram of an online behavior improvement system, in accordance with embodiments of the present disclosure.

With reference now to FIG. 1, shown is a block diagram of an online behavior improvement system 100, in accordance with embodiments of the present disclosure. In the illustrated embodiment, online behavior improvement system 100 includes behavior improvement moderator 102 that is communicatively coupled to user device 120A, user device 120B, user device 120N (collectively referred to as user device(s) 120), and server 130 through a social networking environment 160 via network 150. Behavior improvement moderator 102, user devices 120, and server 130 may be any type of computer system and may be substantially similar to computer system 1101 of FIG. 5. In embodiments, behavior improvement moderator 102 may a standalone device or virtual software application. For example, behavior improvement moderator 102 may be a virtual application located on server 130 that is accessed through a cloud computing network, such as cloud computing environment 50 described in FIG. 6.

Social networking environment 160 may be any type of environment where users can interact with each other. For example, social networking environment 160 may be an online multiplayer game were users communicate through a message board and/or spoken content while perform certain in-game objectives (e.g., competitions, complete missions, collect various items, etc.). In another example, social networking environment 160 may be a social media platform where users can perform various actions (e.g., provide "likes" to other user's posts, provide comments, post images, etc.).

User devices 120 may be any type of device (e.g., smart phone, computer, tablet, game console, etc.) configured to generate communication data and user action data within social networking environment 160. For example, user device 120A may be a game console and user device 120B may be a tablet where both devices generate gaming data (e.g., user messages in a chat box, user skill level data, user action data, etc.) for an online gaming environment monitored by behavior improvement moderator 102.

Network 150 may be any type of communication network, such as a wireless network or a cloud computing network. Network 150 may be substantially similar to, or the same as, cloud computing environment 50 described in FIG. 6. In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium.

For example, behavior improvement moderator 102 may communicate with user devices 120 and server 130 using a WAN, one or more hardwire connections (e.g., an Ethernet cable) and/or wireless communication networks. In some embodiments, the various systems may be communicatively coupled using a combination of one or more networks and/or one or more local connections. For example, behavior improvement moderator 102 may communicate with server 130 using a hardwired connection, while communication between user devices 120 and behavior improvement moderator 102 may be through a wireless communication network.

In the illustrated embodiment, behavior improvement moderator 102 includes processor 104, user profile module 106, NLU module 108, machine learning module 110, and database 112.

In embodiments, user profile module 106 is configured to generate a user profile associated with each user participating in social networking environment 160. User profiles may be stored on database 112 of behavior improvement moderator 102 or server 130. The user profile may include various social identifiers (e.g., email accounts, social media account names, contact information, online gaming accounts, etc.) that allow behavior improvement moderator 102 to track communications and user action data specific to each user. The user profile may include a user score generated by the behavior improvement moderator 102 that relates to the behavioral characteristics of the respective user. Behavior improvement moderator 102 may implement (e.g., send, output, message, etc.) various corrective actions to each user by identifying the user through their associated user profile. The user profile may include identifying information for various user devices 120 utilized by the respective user when accessing the social networking environment 160.

In embodiments, NLU module 108 may collect, monitor, and/or analyze communications (e.g., in-game messaging, social media posts, comments, spoken content, unstructured data, etc.) from social networking environment 160. For example, NLU module 108 may perform sentiment analysis on in-game chat box messages and/or spoken content to determine behavioral characteristics related to each user. For example, NLU module 108 may detect offensive words or phrases from a hostile user directed at one or more other users. NLU module 108 may utilize a scoring model for assessing the communications and determine the hostile user is exhibiting negative behavior if the offensive words or phrases meet or exceed a sentiment threshold.

In embodiments, machine learning module 110 may collect, monitor, and/or analyze user action data received from user devices 120 related to various behavioral characteristics and/or patterns of the user when participating in social networking environment 160. In embodiments, the behavioral characteristics may be based, in part, on user ratings provided by other users, in-game user interactions with other users and/or opponents, game objective progress, user skill level, and the like. Machine learning module 110 may determine a user score based on the analysis of both the user action data and the communications related to each user. The user score may be determined using a single overall score or a combination of separate scores assigned to each respective behavioral characteristic. In some embodiments, machine learning module 110 may include weighted scores for various behavioral characteristics depending on the importance of the behavioral characteristic in relation to accurately predicting a user's behavior.

In embodiments, behavior improvement moderator 102 will compare the user score for each respective user to a set of corrective action thresholds. If a corrective action threshold is met or exceeded, behavior improvement moderator 102 will implement a corresponding corrective action in an attempt to improve the user score of the respective user. The set of corrective actions may increase in severity depending on the user score. For example, a first corrective action threshold may be triggered when a user score falls below 90% resulting in a message sent to the respective user with a hint or tip on improving their behavior. While a second corrective action threshold may be triggered when a user score falls below 50% resulting in a temporary removal or confinement of the user to an area within the gaming environment. Behavior improvement moderator 102 may continuously monitor both the communications and the user action data in response to implementing corrective actions and adjust user scores based on changes in the data. The adjusted user scores may further be compared to the set of corrective action thresholds.

In embodiments, machine learning module 110 may comprise various machine learning engines (artificial neural network, correlation engines, reinforcement feedback learning model, supervised/unsupervised learning model, etc.) configured to analyze data generated by online behavior improvement system 100 to improve predictions for implementing effective corrective actions. For example, machine learning module 110 may utilize a feedback learning model to determine if implemented corrective actions have been effective at improving a hostile user's behavior by analyzing subsequent communications and user action data with respect to a change in the user score. If data indicates the corrective actions are not effective, the machine learning module 110 will continue to implement further corrective actions with varying degrees of severity until the user score improves.

In embodiments, machine learning module 110 may determine which historic corrective actions have the highest success rates at improving behavior in historic hostile users. Over time, machine learning module 110 can analyze the results to accurately predict which corrective actions improve and/or mitigate hostile behavior in the most effective way and implement those corrective actions at a higher rate.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of online behavior improvement system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with behavior improvement system 100 may not be present, and the arrangement of components may vary.

For example, while FIG. 1 illustrates an example online behavior improvement system 100 having a behavior improvement moderator 102, three user devices 120, and a single server 130, communicatively coupled via a single social networking environment 160, suitable network architectures for implementing embodiments of this disclosure may include any number of behavior improvement moderators, user devices, servers, and social networking environments. The various models, modules, systems, and components illustrated in FIG. 1 may exist, if at all, across a plurality of behavior improvement moderators, user devices, servers, and social networking environments.

Figure 2:
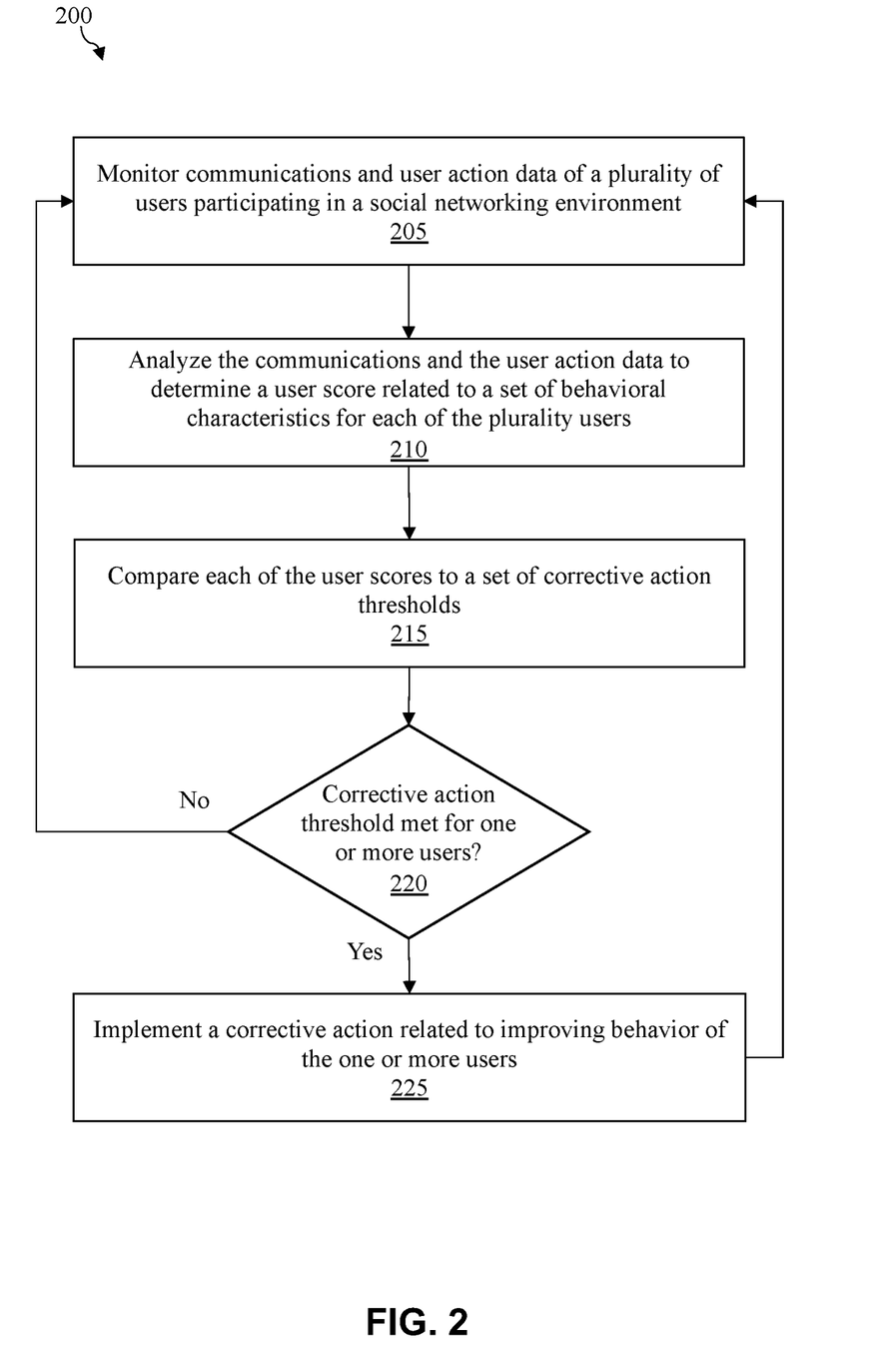
FIG. 2 illustrates a flow diagram of an example process for improving online behavior in social networking environments, in accordance with embodiments of the present disclosure.

Referring now to FIG. 2, shown is a flow diagram of an example process 200 for improving online behavior in social networking environments, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. The process 200 may be performed by processor 104 exemplified in FIG. 1.

The process 200 begins by monitoring communications and user action data of a plurality of users participating in a social networking environment. This is illustrated at step 205. For example, while playing an online multiplayer game, the system will monitor what each user says to the other users (e.g., via audio and/or textual communications) and how the user interacts with the other users in the game (e.g., actively participating in gaming objectives vs. not participating).

The process 200 continues by analyzing the communications and the user action data to determine a user score related to a set of behavioral characteristics for each of the plurality of users. This is illustrated at step 210. The analyzing may be performed by utilizing NLU and machine learning. Returning to the previous example, the system may perform a sentimental analysis on in-game communications to determine if the users are exhibiting positive and/or negative behavioral characteristics in relation to one another (e.g., use of offensive or demeaning language, etc.). The communications may be scored in relation to the presence of positive and/or negative sentiment. For example, the detection of offensive language may receive a negative score or value for a respective user which may reduce their overall user score.

Further, the system will determine from the user action data whether each user is exhibiting positive and/or negative behavioral characteristics with respective to their in-game performance. For example, the system may determine behavioral characteristics by assessing the following: skill level for each user based on their actions/movements within the game (e.g., success in completing objectives, competency in performing moves/tasks, etc.); user ratings assigned to each user by other users (e.g., player opinions); trending user skills (e.g., skillset of the user showing they are improving); and/or user rank in comparison to other users within the game. Once the communications and the user action data have been analyzed, the system will determine a user score for each user in relation to their behavioral characteristics.

For example, an expert user may be assessed a relatively high user score (e.g., 95 out of 100, 18/20, 75%, etc.) based positive communications with other users, high skill level, positive user ratings, positive trend in user skills, and/or high user rank with respect to other users. The user score may be continuously updated based on analyzing current and/or subsequent user behavior (e.g. detecting further positive and/or negative communications and/or user actions).

For example, the expert user may be playing an online multiplayer game with novice users that requires the users to work together to complete a mission. The expert user may become frustrated because the novice users are having trouble completing the mission. The expert user may message the novice users stating that they are poor players and have no business playing the game. Further, the expert user out of frustration may begin to deliberately lose the game (e.g., by not participating in the mission, allowing their character to be easily defeated, etc.) causing other users to have a negative experience. The system may analyze the expert user's current negative behavior and reduce the expert user's user score accordingly (e.g., reduce the expert's user score of 91 to 83 because of the negative behavior).

The process 200 continues by comparing each of the user scores for the plurality of users to a set of corrective action thresholds. This is illustrated at step 215. The set of corrective action thresholds correspond to a set of corrective actions, respectively. For example, the set of corrective action thresholds may comprise a first corrective action threshold that corresponds to implementing a first corrective action and a second corrective action threshold that corresponds to implementing a second corrective action.

The process 200 continues by determining if a corrective action threshold has been met for one or more users based on their user score. This is illustrated at step 220. If the user score does not meet one of the corrective action thresholds ("No" at step 220), the system will continue to monitor the communications and user action data for the plurality of users by returning to step 205. Returning to the previous example, even though the expert user's user score has been reduced to 83, it may not be low enough to trigger a corrective action threshold (e.g., user score not meeting a specific range, minimum, maximum, or trending value). In this way, the system is prevented from implementing various corrective actions for users when they make simple mistakes and/or sporadic negative comments which may occur doing normal game play.

In response to a user score associated with one of the users meeting one of the corrective action thresholds ("Yes" at step 220), the process 200 will continue by implementing a corrective action related to improving the behavior of the respective user. This is illustrated at step 225. In embodiments, the corrective action may be any type of action configured to improve the behavior of the user (e.g., a positive/negative reinforcement actions).

For example, the system may send a message to the user with a tip or guide on good sportsmanship to help the user improve their user score. Other examples of corrective actions may include reminders of the rules of the game with regard to negative behavior, warnings that further detection of negative behavior may result in increased action, warnings regarding removal or confinement of their character within the game, additional reduction of the user score, and/or banning or suspending the user from gameplay.

Alternatively, the system may attempt to reward the user for increasing their user score. For example, the corrective action may be in the form of an incentive to receive an award (e.g., increased player health points, tokens, game credits, etc.) for improving the user score. For example, a hostile user may improve their user score by engaging in positive communications (e.g., encouraging other users, mentoring other novice users, etc.) and actively participating in game play (e.g., helping others achieve game objectives). In this way, hostile users that fail to improve their behavior in response to receiving corrective actions will continue to be penalized by reducing their user score, while hostile users that improve their behavior will be rewarded for their positive game play.

Figure 3:
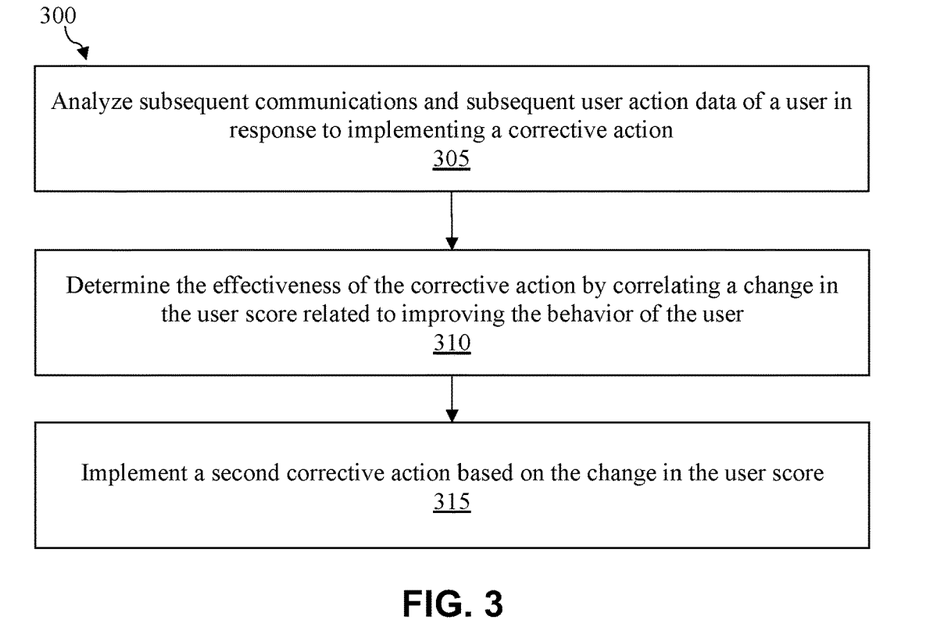
FIG. 3 illustrates a flow diagram of an example process for analyzing feedback from a user in response to a corrective action, in accordance with embodiments of the present disclosure.

Once the first corrective action has been implemented, the process 200 may return to step 205 where the system will continuously monitor communications and user action data of the respective user (e.g., hostile user) in response to implementing the corrective action (which is described in more detail in FIG. 3).

Referring now to FIG. 3, shown is a flow diagram of an example process 300 for analyzing feedback from a user in response to implementing a corrective action, in accordance with embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In embodiments, process 300 may be, in addition to, or a subset of process 200. In embodiments, the process 300 is a computer-implemented process. The process 300 may be performed by processor 104 exemplified in FIG. 1.

The process 300 begins by analyzing subsequent communications and subsequent user action data of a user in response to implementing a corrective action. This is illustrated at step 305. In embodiments, the system may utilize a feedback learning model to determine if a corrective action improved a hostile user's behavior. For example, in a multiplayer game where users are required to work together as a team to complete an objective, the system may have implemented a corrective action to a hostile user for not following along with the team plan (e.g., for intentionally repeating mistakes, incorrect player movements around a game map, presence of negative communications, etc.). For example, the corrective action may be a warning to the hostile user that further negative gameplay will result in a temporary removal from the current team objective and/or placement in another game environment with other hostile users.

Once the corrective action is implemented, the system will analyze how the hostile reacts to implementing the correction action. The system will determine the change in the user score by analyzing the subsequent communications and user action data of the hostile user and adjust the score accordingly. If the system detects negative behavior based on the hostile user's interactions, then the hostile user's user score will be further reduced.

The process 300 continues by determining the effectiveness of the corrective action by correlating a change in the user score related to improving behavior of the user. This is illustrated at step 310. Returning to the previous example, the system will analyze whether the user score of the hostile user has increased or decreased as a result of implementing the warning. The adjusted user score will be compared to the set of corrective action thresholds and depending on the change, further corrective actions may be implemented. If the user score has increased, the system will determine that the implemented corrective action has been effective at improving the behavior of the hostile user. If the user score has decreased, the system will determine that the corrective action is ineffective necessitating further corrective actions to improve the hostile user's negative behavior.

In embodiments, the system may include a trend analysis to determine the effectiveness of the corrective action. For example, the hostile user may have a lower user score but show signs of behavior improvement because their user score is trending in a positive direction. In embodiments, the trend analysis may be compared against a trend threshold or included in the determination of the user score to allow the system to accurately implement successive corrective actions accordingly.

The process 300 continues by implementing a second corrective action based on the change in the user score. This is illustrated at step 315. Returning to the previous example, if the system determines that the user score has continued to decrease after the initial warning, the system may implement further corrective actions that increase in severity to deter continued negative behavior of the hostile user. For example, the system may follow through with the warning and temporarily remove the hostile user and/or place the hostile user in another gaming environment with other hostile users.

In embodiments, if the system determines the change in the user score is a positive change then the second corrective action may be related to positive reinforcement for improving the behavior of the hostile user. For example, if in response to the warning, the hostile user begins to cooperate with the other users (e.g., participating in team plan, positive communications, etc.), then the system may reward the hostile user for their improved behavior. In embodiments, the system may use any type of reward for improved behavior. For example, the system may offer in-game tokens, game credits, entries into a drawing for prizes, etc.

Figure 4:
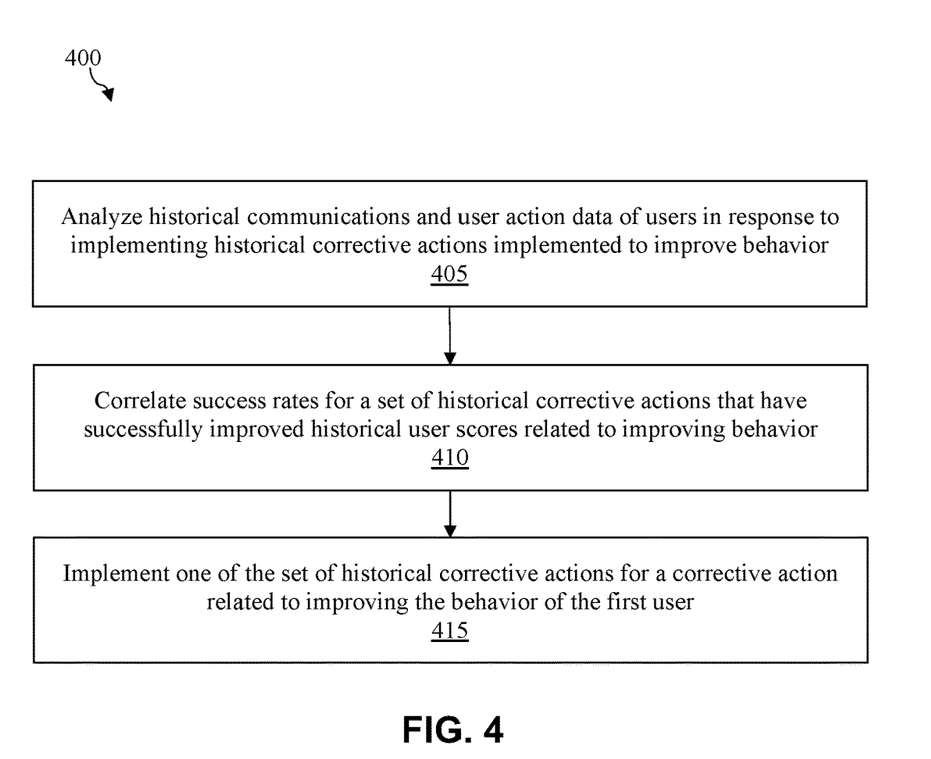
FIG. 4 illustrates a flow diagram of an example process for predicting implementation of successful corrective actions for improving online behavior, in accordance with embodiments of the present disclosure.

Referring now to FIG. 4, shown is a flow diagram of an example process 400 for predicting implementation of successful corrective actions for improving online behavior, in accordance with embodiments of the present disclosure. The process 400 may be performed by processing logic that comprises hardware (e.g., circuitry, dedicated logic, programmable logic, microcode, etc.), software (e.g., instructions run on a processor), firmware, or a combination thereof. In embodiments, process 400 may be, in addition to, or a subset of process 200 or 300. In some embodiments, the process 400 is a computer-implemented process. The process 400 may be performed by processor 104 exemplified in FIG. 1.

The process 400 begins by analyzing, using machine learning, historical communications and historical user action data of users in response to implementing historical corrective actions. This is illustrated at step 405. In embodiments, the system can utilize machine learning and/or deep learning, where algorithms or models can be generated by performing supervised, unsupervised, or semi-supervised training on historical data generated from the system to determine which corrective actions have been the most successful and/or unsuccessful in improving the behavior of hostile users in the past.

The process 400 continues by correlating success rates for a set of historical corrective actions that have successfully improved historical user scores related to improving behavior for the historical users. This is illustrated at step 410. The system will determine which actions have had the most success when mitigating and/or improving negative/hostile behavior for previous users (e.g., historical users).

The process 400 continues by implementing one of the set of historical corrective actions for a corrective action (e.g., at step 225 of process 200) related to improving the behavior of a user. This is illustrated at step 415. In this way, the system may use predictive analysis to implement the most successful corrective actions for reforming/improving online behavior of various user. In some embodiments, the system may receive a set of default corrective actions that are not based on historical corrective actions for instances where the system does not have enough data to determine historical success rates of previously implemented corrective actions. The set of default actions may be based on conventional wisdom for reducing negative behavior of the hostile users. The system may determine which of the set of default actions have proven successful and increase the likelihood that successful actions will be selected for future corrective actions. For example, if one default action has a high success value, the system may increase the use of that default action as compared to a similar (e.g., same level of correction), but less successful, action.

Figure 5:
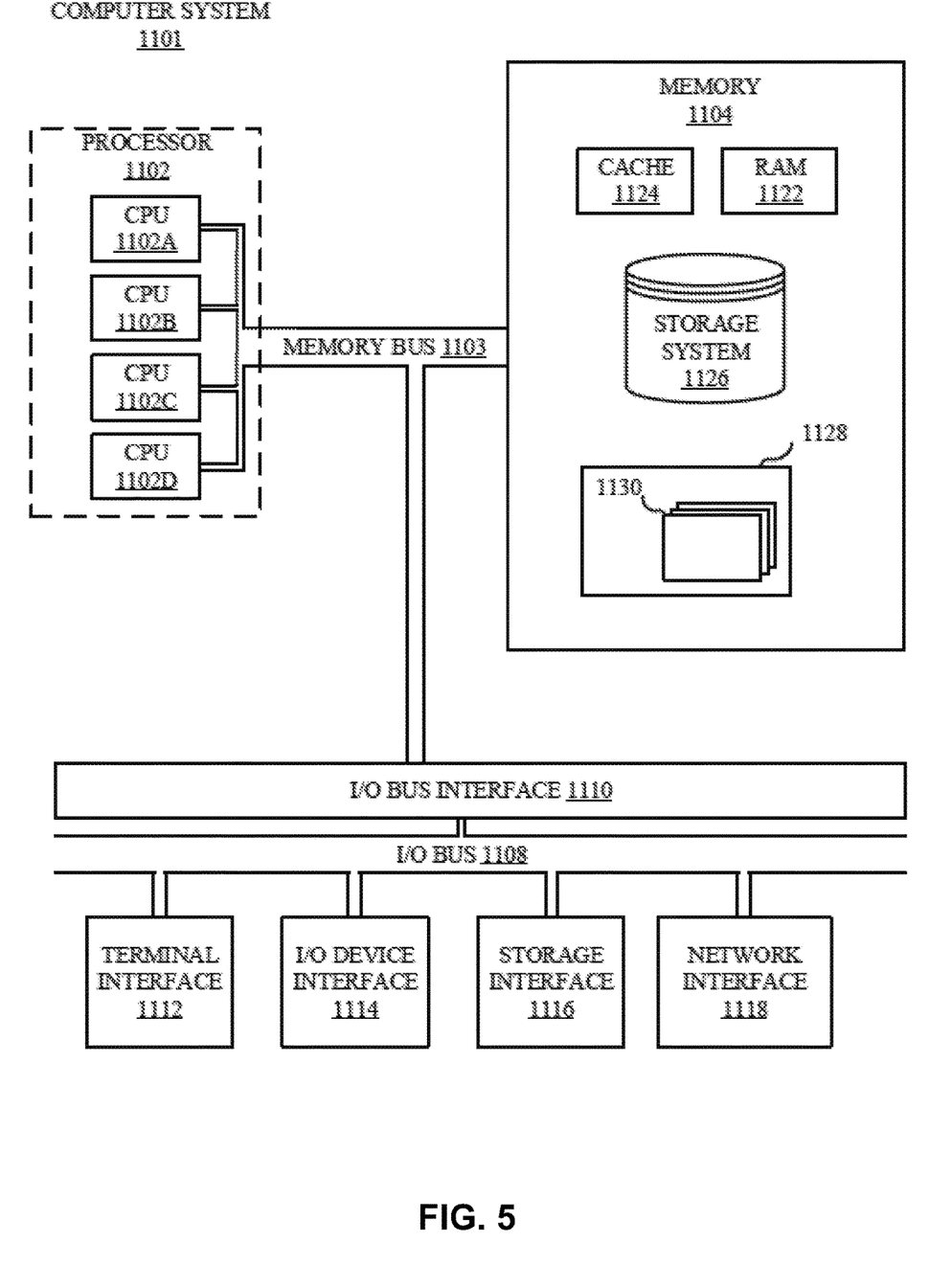
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200, 300, and 400).

System memory subsystem 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 5 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
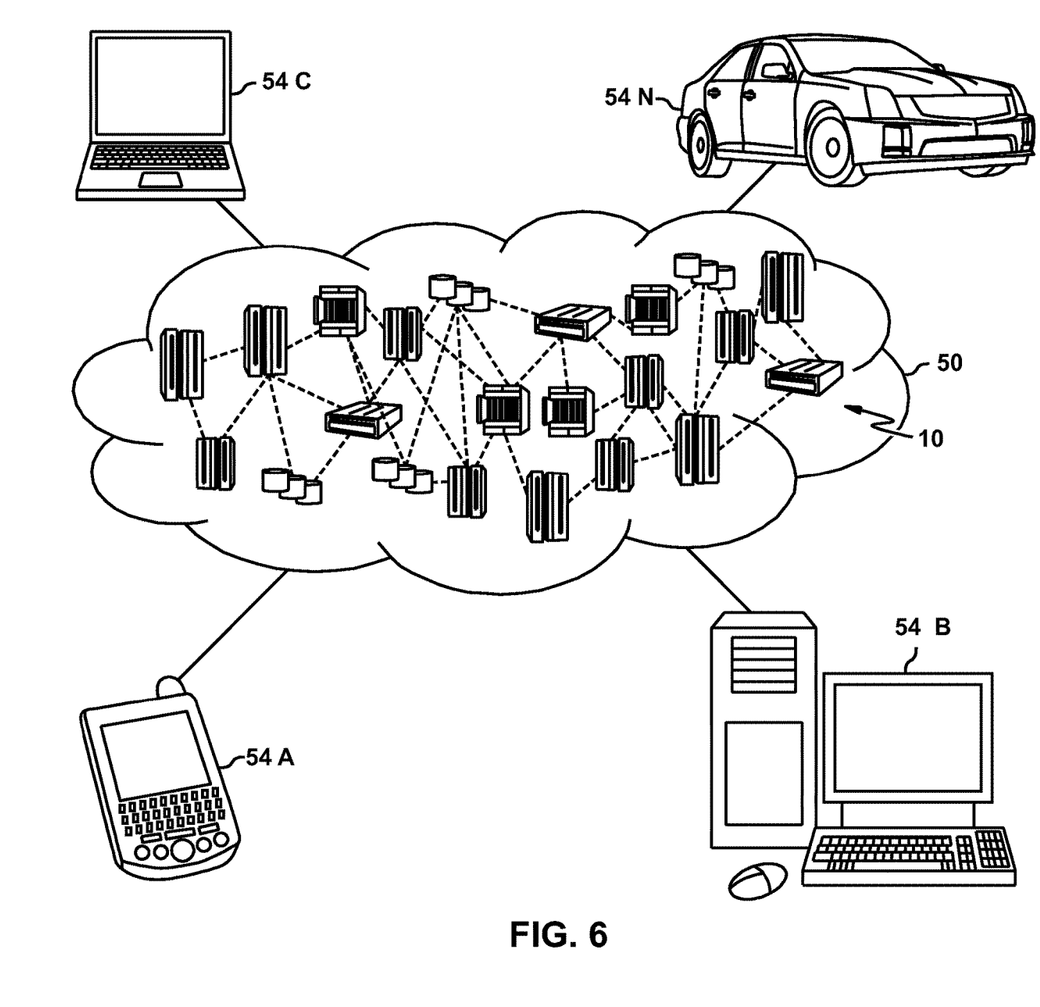
FIG. 6 depicts a cloud computing environment in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
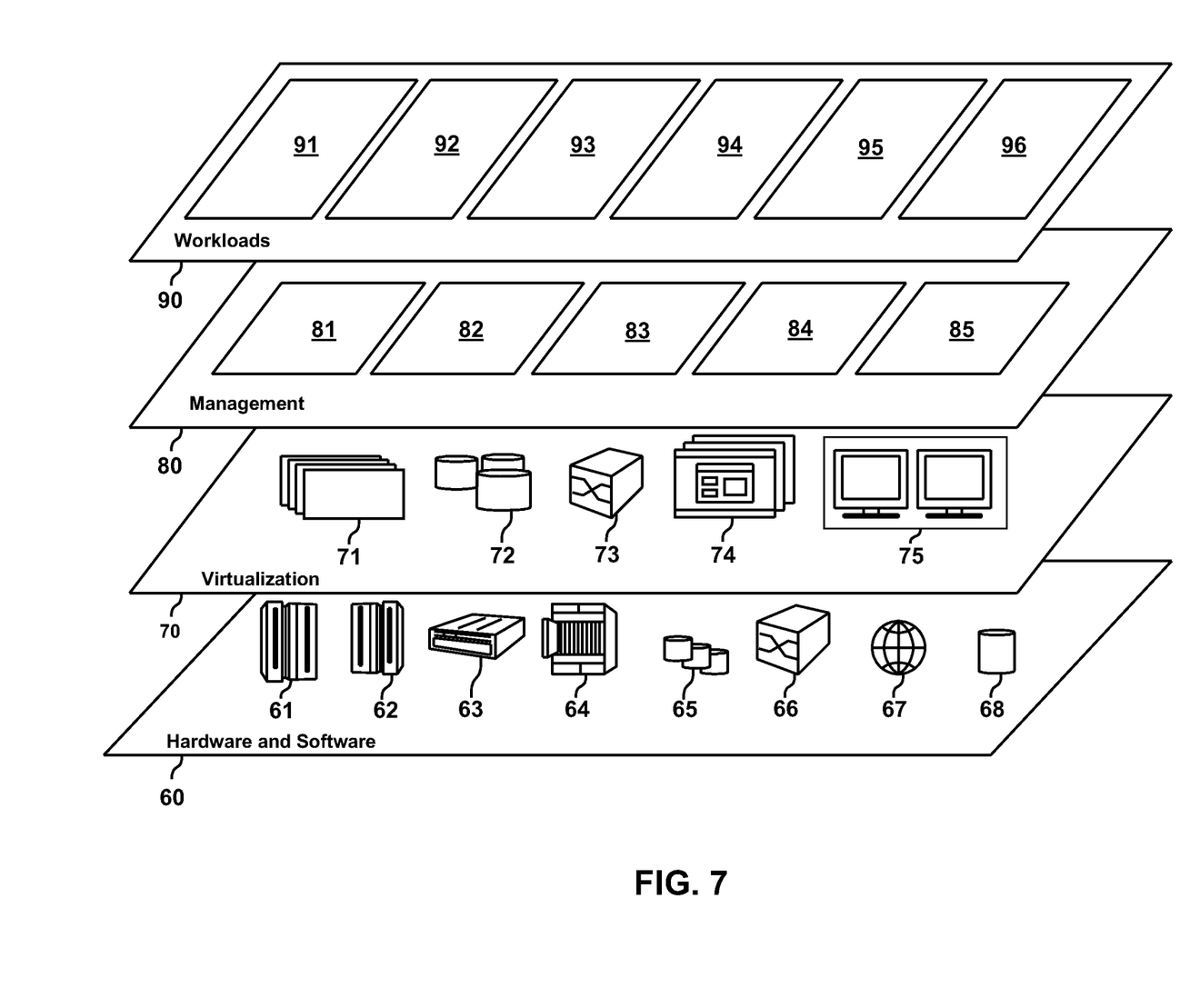
FIG. 7 depicts abstraction model layers in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and behavior improvement moderator software 68 in relation to the behavior improvement moderator 102 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   monitoring communications and user action data of a plurality of users participating in a social networking environment;
   analyzing the communications and the user action data to determine a user score related to a set of behavioral characteristics for each of the plurality of users;
   comparing the user score for each of the plurality of users to a set of corrective action thresholds;
   in response to a first user score associated with a first user meeting one of the set of corrective action thresholds, implementing a first corrective action related to improving the behavior of the first user;
   analyzing subsequent communications and subsequent user action data of the first user in response to implementing the first corrective action;
   determining, using machine learning, an effectiveness of the first corrective action by correlating a change in the first user score related to improving behavior of the first user; and
   implementing a second corrective action based on the change in the first user score.

2. The computer-implemented method of claim 1, wherein the first corrective action is selected from the group consisting of:
   messaging the first user with a tip for improving the first user score;
   temporarily removing the first user from participating in an aspect of the social networking environment;
   reducing the first user score;
   banning the first user from participating in the social networking environment;
   warning the first user that further detection of a reduction in the first user score will result in an increase in severity of a second corrective action; and
   providing the first user with an incentive to receive an award for improving the first user score.

3. The computer-implemented method of claim 1, wherein the change in the first user score is a positive change and the second corrective action is related to positive reinforcement for improving behavior of the first user.

4. The computer-implemented method of claim 3, wherein the second corrective action is selected from the group consisting of:
   rewarding the first user with an in-game token;
   rewarding the first user with a game credit; and
   providing an opportunity to receive a prize to the first user.

5. The computer-implemented method of claim 1, further comprising:

analyzing, using machine learning, historical communications and historical user action data of historical users in response to implementing historical corrective actions;

correlating success rates for a set of historical corrective actions that have successfully improved historical user scores related to improving behavior for the historical users; and implementing one of the set of historical corrective actions when implementing the first corrective action related to improving the behavior of the first user.

6. The computer-implemented method of claim 1, wherein the set of corrective action thresholds comprise a first corrective action threshold that corresponds to implementing the first corrective action and a second corrective action threshold that corresponds to implementing the second corrective action.

7. The computer-implemented method of claim 1, wherein analyzing the communications and the user action data to determine the user score related to the set of behavioral characteristics for each of the plurality of users is performed using natural language understanding and machine learning.

8. The computer-implemented method of claim 1, wherein the social networking environment is an online game and the set of behavioral characteristics are based on analyzing one or more behavioral characteristics chosen from the group consisting of:
   sentiment analysis of in-game communications;
   a user level related to a skillset for each of the plurality of users;
   a user rating provided by one or more other users; and
   a trend related to the skillset for each of the plurality of users while playing the online game.

9. The computer-implemented method of claim 1, wherein the social networking environment is selected from the group of:
   an online game;
   a social media website; and
   a corporate social network.

10. The computer-implemented method of claim 1, wherein analyzing the communications and the user action data to determine the user score is performed over a predetermined time period.

11. The computer-implemented method of claim 1, wherein the social networking environment is an online game and wherein analyzing the communications and the user action data to determine the user score is performed over a predetermined number of games played by each of the plurality of users.

12. A system comprising:
   a network;
   a processor; and
   a computer-readable storage medium communicatively coupled to the processor and storing program instructions which, when executed by the processor, cause the processor to perform a method comprising:
      monitoring communications and user action data of a plurality of users participating in a social networking environment;
      analyzing the communications and the user action data to determine a user score related to a set of behavioral characteristics for each of the plurality of users;
      comparing the user score for each of the plurality of users to a set of corrective action thresholds;
      in response to a first user score associated with a first user meeting one of the set of corrective action thresholds, implementing a first corrective action related to improving the behavior of the first user;
      analyzing subsequent communications and subsequent user action data of the first user in response to implementing the first corrective action;
      determining, using machine learning, an effectiveness of the first corrective action by correlating a change in the first user score related to improving behavior of the first user; and
      implementing a second corrective action based on the change in the first user score.

13. The system of claim 12, wherein the first corrective action is selected from the group consisting of:
   messaging the first user with a tip for improving the first user score;
   temporarily removing the first user from participating in an aspect of the social networking environment;
   reducing the first user score;
   banning the first user from participating in the social networking environment;
   warning the first user that further detection of a reduction in the first user score will result in an increase in severity of a second corrective action; and
   providing the first user with an incentive to receive an award for improving the first user score.

14. The system of claim 12, wherein the change in the first user score is a positive change and the second corrective action is related to positive reinforcement for improving behavior the behavior of the first user.

15. A computer program product comprising a computer-readable storage medium having program instructions embodied therewith, the program instructions executable by a processor to cause the processor to perform a method comprising:
   monitoring communications and user action data of a plurality of users participating in a social networking environment;
   analyzing the communications and the user action data to determine a user score related to a set of behavioral characteristics for each of the plurality of users;
   comparing the user score for each of the plurality of users to a set of corrective action thresholds;
   in response to a first user score associated with a first user meeting one of the set of corrective action thresholds, implementing a first corrective action related to improving behavior of the first user;
   analyzing subsequent communications and subsequent user action data of the first user in response to implementing the first corrective action;
   determining, using machine learning, an effectiveness of the first corrective action by correlating a change in the first user score related to improving behavior of the first user; and
   implementing a second corrective action based on the change in the first user score.

16. The computer program product of claim 15, wherein the first corrective action is selected from the group consisting of:
   messaging the first user with a tip for improving the first user score;
   temporarily removing the first user from participating in an aspect of the social networking environment;
   reducing the first user score;
   banning the first user from participating in the social networking environment;

warning the first user that further detection of a reduction in the first user score will result in an increase in severity of a second corrective action; and providing the first user with an incentive to receive an award for improving the first user score.

17. The computer program product of claim 15, wherein the change in the first user score is a positive change and the second corrective action is related to positive reinforcement for improving behavior the behavior of the first user.

* * * * *